June 18, 1935.  R. G. FERRIS  2,005,615
VENTILATING MEANS
Filed July 31, 1933  3 Sheets-Sheet 3
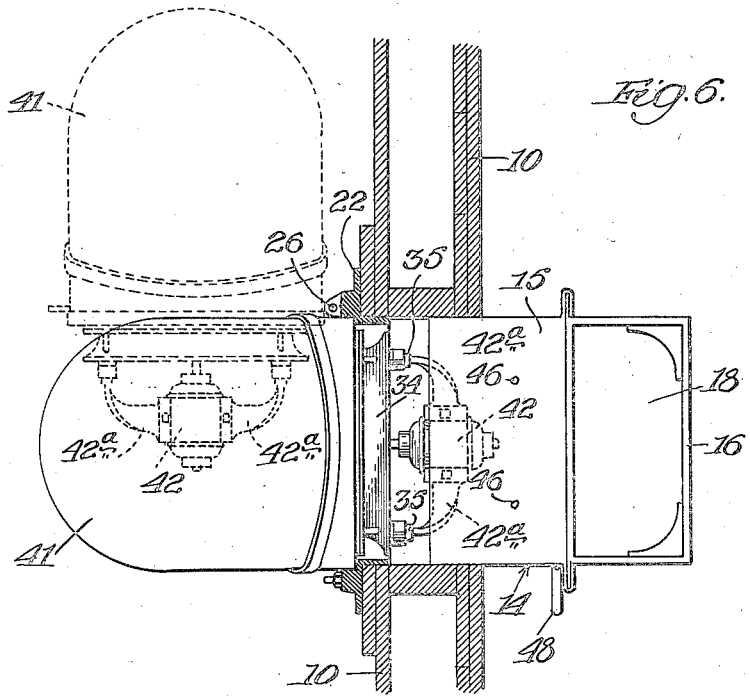
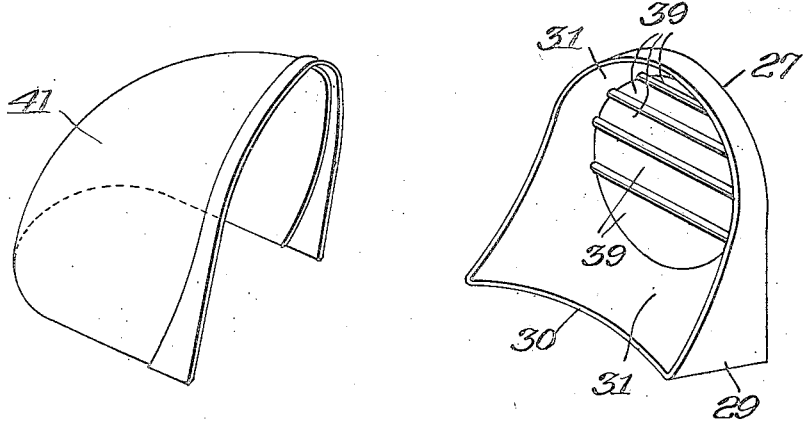
Inventor:
Robert G. Ferris,
By Dyrenforth, Lee, Chritton & Wiles,
Attys.

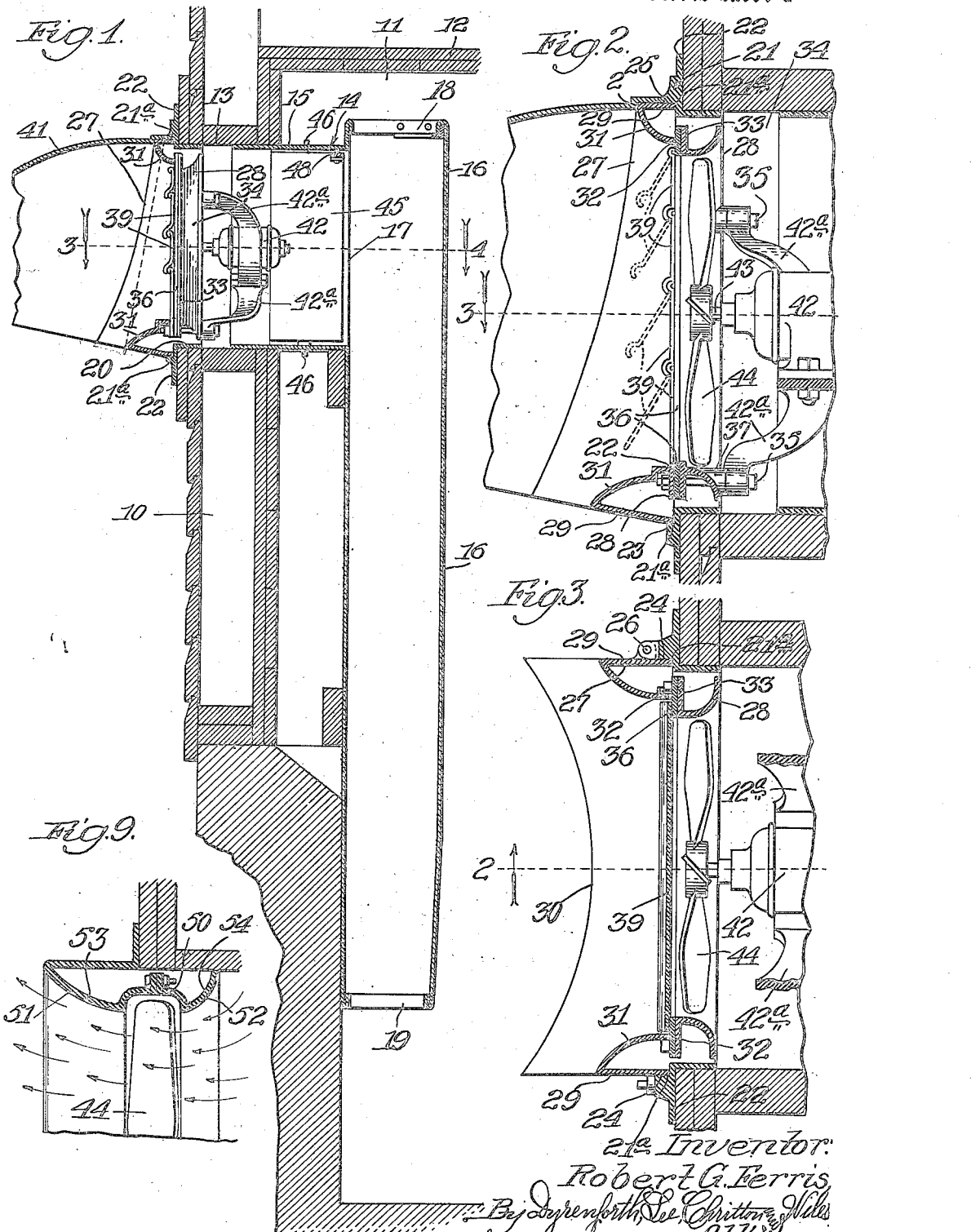

Patented June 18, 1935

2,005,615

UNITED STATES PATENT OFFICE 2,005,615

VENTILATING MEANS

Robert G. Ferris, Harvard, Ill., assignor to Starline, Inc., Harvard, Ill., a corporation of Illinois Application July 31, 1933, Serial No. 683,079

8 Claims. (Cl. 98—43)

My invention relates to the ventilation of buildings and more particularly to the ventilation of stalls or barns, as for example cow-barns, which it is desired be maintained within desired temperature limits and vented of the moisture discharged by the animals into the air within the building.

My object, generally stated, is to provide improvements in ventilating means for such purpose to the end that they will be better adapted for performing their functions.

More specifically certain of my more particular objects are to provide for the drawing of the air from the space to be ventilated and forcing it freely to the atmosphere; to provide against the influx of air currents, especially by the action of the wind, into the space to be ventilated when the ventilating means are inactive; to provide a construction whereby both sides of the fan and the motor for operating it may be rendered readily accessible for cleaning; to provide a construction involving an electric-motor-driven fan, the flow of air through which may be throttled or closed, and the fan continued at unreduced speed, without danger of injuring the motor; to minimize the transmission of vibration to the conduit-structure within the space to be ventilated and thereby reduce objectional humming; and other objects as will be understood from the following description.

Referring to the accompanying drawings:

Figure 1 is a broken view in sectional elevation of a building, as for example an animal stall or barn, equipped with my improved ventilating means.

Figure 2 is an enlarged broken view in sectional elevation of a portion of the ventilating apparatus, the section being taken at the line 2 on Fig. 3.

Figure 3 is a broken plan sectional view of the construction shown in Fig. 2, the section being taken at the lines 3 on Figs. 1 and 2 and viewed in the direction of the respective arrows.

Figure 6 is a plan view of the structure shown in Fig. 1, showing by dotted lines the position to which the structure carrying the hood, louvers and fan and motor assembly may be swung to open position.

Figure 7 is a perspective view of the hood.

Figure 8 is a perspective view of the member on which the hood is mounted; and

Figure 9, a fragmentary sectional view showing a modification of the structure.

Figure 4:
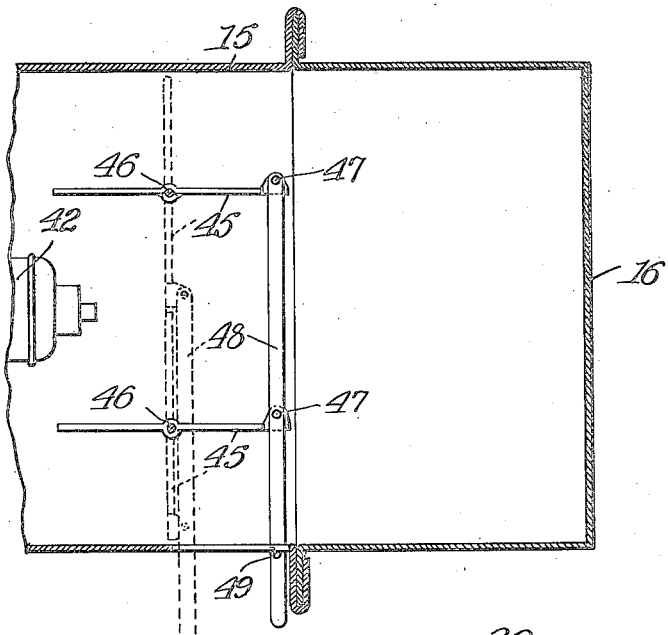
Figure 4 is a broken plan sectional view of the portion of the structure immediately to the rear of that shown in Figs. 2 and 3, the section being taken at line 4 on Fig. 1 and viewed in the direction of the arrow.
Figure 5:
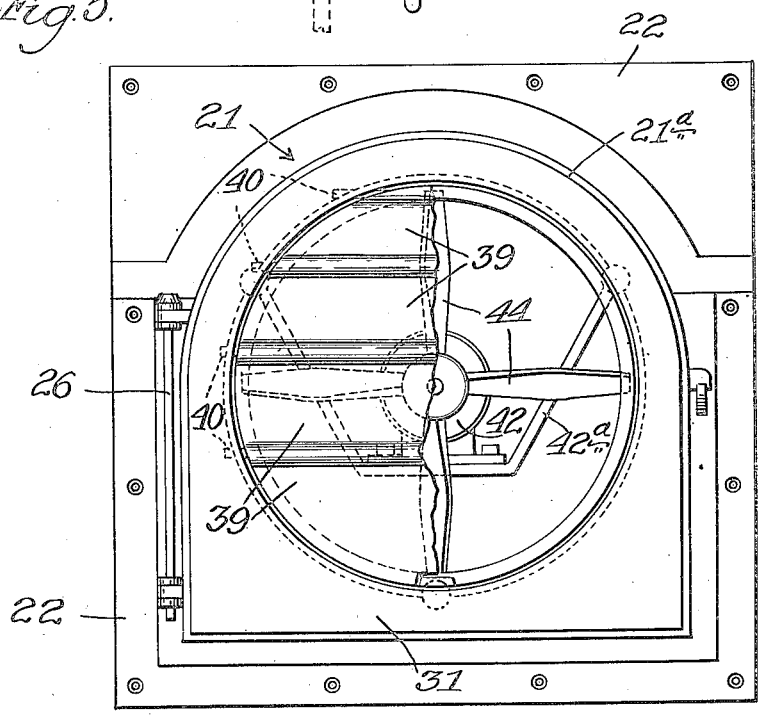
Figure 5 is a front end view of the structure shown in Figs. 2 and 3, the hood portion being omitted and a portion of the louver-structure broken away.

Referring to the embodiment of my invention illustrated in Figs. 1–8, inclusive, 10 represents one of the outer side walls of a building to be ventilated, as for example a barn having a lower compartment 11 the ceiling of which is represented at 12, the compartment forming a stall, or housing, for animals.

The wall 10 contains a ventilating opening 13, of preferably rectangular shape, into which a conduit 14 communicating with the interior of the compartment 11, opens.

The conduit 14 is shown as of a type commonly employed for venting the air from both the top and bottom of the compartment and comprises a horizontal pipe-section 15 secured at one end in the inner end of the opening 13, and a substantially vertically disposed flue-section 16 communicating, through an opening 17 in its side wall adjacent its upper end, with the inner end of the pipe-section 15, the upper and lower ends of the flue-section 16 being open as indicated at 18 and 19.

Fitting in the outer end of the opening 13 is the rearwardly extending continuous flange 20 of a rectangular frame 21 having a continuous vertical flange 22 lapping the outer surface of the wall 10, the opening through this frame presenting a horizontal bottom wall 23, parallel vertical side walls 24 and an arched upper wall 25.

Hinged as represented at 26 to the frame 21, to swing on a vertical axis, is a mounting structure for a fan, motor, hood and louvers; this mounting structure comprising a pair of hollow members 27 and 28 connected together as hereinafter described.

The outer member 27 at which the supporting structure above referred to and of which this member is a part, is hinged to the frame 22, is of the same general shape as the said opening through the frame 21 but of slightly larger dimensions, the inner end of the member 27 fitting into an endless recess 21a provided about the opening through the frame 22, whereby the member 27 is telescoped with the frame 22.

The member 27 is formed of an outer wall 29 affording to the member 27 the shape above described, and which as above stated is of arch form at its top, the forward lower edge of the wall being concaved as represented at 30. The member is also formed of a wall portion 31 which is connected at its forward edge throughout the forward marginal edge of the wall 29 and curved throughout its extent inwardly toward the center of the opening through the member 27 and rearwardly as represented, the shape of this wall being such, as shown, that the inner edge 32 describes a circle substantially centered with the rectangular opening 13 in the wall 10.

The inner member 28 is formed of a ring 33 which flatwise opposes the inner circular end portion of the wall 31 and a rearwardly flaring flange 34 springing from the inner edge of the ring, the flange 34 curving rearwardly and outwardly as shown.

The members 27 and 28 are secured together by an annular series of bolts 35, with a gasket 36, such as of felt, interposed between the opposing surfaces of the members 27 and 28, the bolts 35 extending through bosses 37 on the ring 33 and through lugs 38 on the wall 31, these bolts also serving to hold the motor, hereinafter described, in place.

The outer member 27 is equipped at its inner end with a vertical series of horizontally-disposed horizontally-trunnioned louvers 39 which, when in closed position as shown, successively lap each other and the lower one the lower side of the gasket 36, as represented, these louvers being of such length and so shaped at their ends as to substantially fill the circular opening at the inner circular edge of the wall 31.

Each louver 39 is provided at its opposite ends with trunnions, as represented at 40 at one end of each louver, which extend beyond the ends of the louvers and into notches in the rear edge of the wall 31, in which notches the trunnions are held against displacement by the part backing this edge of the wall 31, viz., the gasket 36 in the particular construction shown.

The trunnions 40 may be provided in any suitable way, it being preferable to form them of rods extending along the upper edges of the louvers and beyond the ends of the latter, the rods being held in place by bending the metal of which the louvers are formed over these rods.

The hood referred to and represented at 41, and the bottom of which is open, fits at its inner end (which is also open) over the top and side portions of the member 27, thus telescoping therewith and is preferably substantially of the form shown, viz., of a shape produced by a quarter revolution of a Roman window of a height equal to its width, thereby presenting at its rear end a shape corresponding with the contour of the outer end of the member 27 with which it telescopes as stated.

The member 27 supports the fan and motor assembly for creating a forced draft through the apparatus, the motor of the assembly being shown at 42 and supported at brackets 42ª on the inner ends of the bolts 35 to extend in the opening 13. The motor shown as an electric motor is provided on its armature shaft 43 with a fan 44 located in the member 28, the fan 44 in accordance with one phase of my invention comprising a plurality of vanes and being of the aeroplane propeller type.

From the foregoing it will be understood that upon actuating the motor 42 suction will be exerted in the flue 16 to draw air from the compartment 11 into the fan and the air thus displaced forced out through the openings between the louvers 39, the latter swinging to open position by reason of the air pressure exerted against them by the action of the fan, and thence to the atmosphere through the open bottom of the hood 41, the vertical dimensions of the successive louvers increasing from the top to the bottom of the series thereof to cause them to open substantially to the same degree under the air pressure exerted against them by the action of the fan.

In practice the course through which ventilation of the space 11 takes place would be provided with any suitable means for controlling the flow through such course, in the arrangement illustrated, the means provided for this purpose, but by way of example only, comprising a pair of dampers 45 located side-by-side in the pipe 15 and rotatable at trunnions 46 thereon about vertical axes, the dampers being shown as pivotally connected at 47 to an actuating bar 48 extending at one end through an opening 49 in the pipe 15.

Referring now to certain of the advantages of my improved construction it will be noted that by mounting the motor and fan assembly as shown and described the attendant may readily clean not only the outer face of the fan and the other parts accessible when the hinged mounting for these parts is in the position shown, but may readily clean the rear face of the fan and the motor and have access thereto for making such repairs as may become necessary by swinging the mounting referred to in a direction away from the opening.

The continuity of metal from the motor 42 to the pipe section 15 being broken the transmission of the sound produced by the motor in operating, and which if the metal were continuous from the motor to the pipe 15 would be amplified and produce objectionable noise, is reduced to the minimum.

The provision of the hood 41 is of advantage as it prevents the blowing of cold air onto the louvers, the hood in fact operating, by the blowing of the wind across it, to produce a siphonic action on the air in the hood producing a negative air pressure in the hood.

The hood has special value when associated with louvers such as shown and described which are movably mounted and opened by the air pressure generated by the fan, inasmuch as it serves to protect the louvers against wind pressure which oftentimes exceeds the pressure generated by the fan and if exerted against the louvers would force them to closed position while the fan is operating.

The louvers serve as an additional means for preventing the entry of cold air into the compartment 11, inasmuch as they automatically close when the fan is not operating thus preventing cold air from entering the compartment 11 and warm air from flowing out of this compartment when the fan is not operating.

Furthermore by providing the rearwardly flaring circular wall 34 which permits of stream line flow of the air, the forwardly flaring circular wall 31 and the passage through the hood of circular cross section at the portion thereof which is impinged by the air in the deflecting of the latter downwardly and without reducing the cross-section of the hood, the structure operates highly efficiently particularly as there is no objectionable eddying of the air in its passage to the outlet of the hood and which when occurring presents resistance to the air flow.

The use of a fan of the multiple vane aeroplane propeller type is of advantage inasmuch as it permits of the use of a damper for controlling the air flow through the ventilating course. A fan of such construction in operation presents such a degree of slippage relative to the air that, regardless of the degree of throttling of the air flow through the course even to the point of complete shut off, whether by the operation of a damper or accidental plugging of the air course, the load on the motor remains substantially a constant, thus avoiding overloading of the motor and dispensing with the need for protective devices for the motor, such as a circuit breaker.

The gasket 36 serves to form an air seal between it and the louvers 39; insulates the member 33 from the parts outwardly beyond it to avoid heat loss and thus prevent freezing of moisture on member 33 and flange 34; prevents transmission of the fan (44) vibration to the metal part 27 thus avoiding noise in the operation of the fan; and minimizes danger of frost forming on the ring 28 to such an extent as to freeze the blades of the fan 44 and prevent the fan from turning.

The construction shown in Fig. 9 is the same as that shown in the preceding figures except the the Venturi portion of the structure in which the fan 44 is located is modified by providing an inwardly opening annular groove 50 between the Venturi surfaces 51 and 52 of the members 53 and 54, respectively, and corresponding with the members 31 and 34, respectively, and within which groove the tops of the blades of fan 44 extend to prevent short-circuiting around these tips.

While I have illustrated and described a particular construction embodying my invention I do not wish to be understood as intending to limit it thereto as the same way be variously modified and altered without departing from the spirit of my invention.

What I claim as new, and desire to secure by Letters Patent, is:

1. In combination with a building a wall of which contains an opening communicating with the interior of the building, a structure at said opening and containing an opening extending therethrough and having a constricted portion intermediate its ends, air-forcing means adjacent said constricted portion and a hood at the exit end of said last-referred-to opening and presenting a downwardly directed outlet, the upper surface of said hood and the surface thereof which deflects the air downwardly toward said outlet being curved lengthwise and crosswise of the hood.

2. In combination with a building a wall of which contains an opening communicating with the interior of the building, a Venturi member comprising inner and outer metal sections located in said opening, a fan supported by the inner section of the Venturi member and a gasket of thermal insulating material interposed between said sections.

3. In combination with a building a wall of which contains an opening communicating with the interior of the building, a structure at said opening and containing an opening extending therethrough and having a constricted portion intermediate its ends, air-forcing means adjacent said constricted portion and a hood at the exit end of said last-referred-to opening and presenting a downwardly directed outlet, said hood being generally of a shape produced by a quarter revolution of a Roman window of a height equal to its width, the upper surface of said hood and the surface thereof which deflects the air downwardly toward said outlet being curved lengthwise and crosswise of the hood and the peripheral portion of said hood describing an arc of a radius substantially equal to the height of the outlet of said second-referred-to opening.

4. In combination with a building a wall of which contains an opening communicating with the interior of the building, a structure at said opening and containing a circular opening therethrough and having a constricted portion, a series of hingedly supported louvers in said circular opening at said constricted portion, and means for forcing air through said opening.

5. In combination with a building a wall of which contains a rectangular opening communicating with the interior of the building, a rectangular frame in said opening and presenting an upwardly arched opening, a hingedly supported upwardly-arched member at said opening and presenting a circular opening therethrough, a hood mounted on the outer end of said member, and means carried by said member for forcing air through said opening in said member and through said hood.

6. In combination with a building a wall of which contains a rectangular opening communicating with the interior of the building, a rectangular frame in said opening and presenting an upwardly arched opening, a hingedly supported upwardly-arched member at said opening and presenting a circular opening therethrough the wall of which at its exit end flares outwardly, a hood mounted on the outer end of said member, and means carried by said member for forcing air through said opening in said member and through said hood.

7. In combination with a building a wall of which contains a rectangular opening communicating with the interior of the building, a rectangular frame in said opening and presenting an upwardly arched opening, a hingedly supported upwardly-arched member at said opening and presenting a circular opening therethrough the wall of which at its inlet and exit ends flares outwardly, a hood mounted on the outer end of said member, and means carried by said member and located adjacent the inlet end of said member for forcing air through said opening in said member and through said hood.

8. In combination, a fan and a member surrounding the fan and containing a Venturi-shaped passage the constricted part of which contains a groove, said fan being located in said constricted part with the tips of its blades extending into said groove, and lapped at its front and rear surfaces by the front and rear sides, respectively, of said groove.

ROBERT G. FERRIS.